United States Patent
Sun et al.

(10) Patent No.: US 12,028,281 B2
(45) Date of Patent: Jul. 2, 2024

(54) HANDLING MULTI-TRP TRANSMISSIONS

(71) Applicant: Apple Inc., Cupertino, CA (US)

(72) Inventors: Haitong Sun, Cupertino, CA (US); Chunhai Yao, Beijing (CN); Chunxuan Ye, San Diego, CA (US); Dawei Zhang, Saratoga, CA (US); Hong He, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 349 days.

(21) Appl. No.: 17/593,590

(22) PCT Filed: May 15, 2020

(86) PCT No.: PCT/CN2020/090582
§ 371 (c)(1),
(2) Date: Sep. 21, 2021

(87) PCT Pub. No.: WO2021/227038
PCT Pub. Date: Nov. 18, 2021

(65) Prior Publication Data
US 2022/0303081 A1    Sep. 22, 2022

(51) Int. Cl.
*H04L 5/00*    (2006.01)
*H04W 72/23*    (2023.01)

(52) U.S. Cl.
CPC .......... *H04L 5/0035* (2013.01); *H04L 5/0048* (2013.01); *H04W 72/23* (2023.01)

(58) Field of Classification Search
None
See application file for complete search history.

(56) References Cited

U.S. PATENT DOCUMENTS

| 2019/0229792 A1 | 7/2019 | John Wilson et al. |
| 2019/0313437 A1 | 10/2019 | Jung et al. |

(Continued)

FOREIGN PATENT DOCUMENTS

| CN | 109845371 | 6/2019 |
| CN | 110754127 | 2/2020 |

(Continued)

OTHER PUBLICATIONS

OPPO, "Discussion on Rel-16 UE features"; 3GPP TSG RAN WG1 #100; R1-2000488; Mar. 6, 2020; 6 sheets.

(Continued)

*Primary Examiner* — Kenny S Lin
(74) *Attorney, Agent, or Firm* — Fay Kaplun & Marcin, LLP

(57) ABSTRACT

A user equipment (UE) is configured with multi-transmission and reception point (multi-TRP) operation. The UE groups capabilities of handling two overlapping physical downlink shared channel (PDSCH) transmissions into a plurality of groups, determining a UE capability of handling two overlapping PDSCH transmissions based on the plurality of groups and transmits the UE capability to a next generation nodeB (gNB) of a 5G new radio (NR) wireless network. The UE also determines if a demodulation reference signal (DMRS) of a physical downlink shared channel (PDSCH) transmission collides with a cell-specific reference signal (CRS) of a long term evolution (LTE) transmission and determines if the CRS originated from a same multi-transmission/reception point (TRP) as the DMRS.

20 Claims, 5 Drawing Sheets

(56) References Cited

U.S. PATENT DOCUMENTS

| | | |
|---|---|---|
| 2019/0363843 A1 | 11/2019 | Gordaychik |
| 2020/0077369 A1 | 3/2020 | Zhang et al. |
| 2021/0391956 A1* | 12/2021 | Gou .................... H04L 1/1854 |

FOREIGN PATENT DOCUMENTS

| | | | |
|---|---|---|---|
| CN | 111082912 | 4/2020 | |
| EP | 3836707 A1 * | 6/2021 | ............ H04L 5/001 |
| WO | 2020/020180 | 1/2020 | |
| WO | WO-2020076830 A1 * | 4/2020 | ........... H04L 1/0013 |
| WO | WO-2020204660 A1 * | 10/2020 | ........ H04W 72/0406 |

OTHER PUBLICATIONS

OPPO, "Discussion on Rel-16 eMIMO UE features"3GPP TSG RAN WG1 #100bis; R1-2001738; Apr. 30, 2020; 7 sheets.

Moderator (OPPO), "FL summary for Multi-TRP/Panel Transmission"; 3GPP TSG RAN WG1 #100bis; R1-2002406; Apr. 14, 2020; 34 sheets.

\* cited by examiner

HANDLING MULTI-TRP TRANSMISSIONS

BACKGROUND

A user equipment (UE) may establish a connection to at least one of a plurality of different networks or types of networks. When establishing the network connection such as, for example, a connection to a 5G new radio (NR) network, a next generation NodeB (gNB) transmits downlink control information (DCI) to the UE via a physical downlink control channel (PDCCH). The PDCCH is transmitted to the UE via one or more control resource sets (CORESETS), each of which includes a transmission configuration indicator (TCI) state configured by the gNB.

One type of information on the PDCCH is scheduling of a physical downlink shared channel (PDSCH) transmission and a beam over which the UE should use to receive the PDCCH. In some cases, the UE may receive the PDCCH on one component carrier (in one serving cell) with scheduling of a PDSCH on a different component carrier (in a different serving cell). However, regardless of which beam is identified in the PDCCH, if the PDSCH is scheduled with a time offset that is less than a time it takes the UE to switch beams (timeDurationForQCL), the UE may use a default beam to receive the PDSCH. Also, if the gNB does not configure a beam for the UE to receive the PDSCH, the UE would also use the default beam to receive the PDSCH in this case. The default beam selected by the UE is the beam that corresponds to the lowest TCI codepoint from a plurality of TCI codepoints, each of which includes two different TCI states.

Multiple PDSCHs (e.g., two PDSCHs) may be scheduled for UE reception via multi-transmission reception points (TRP) to improve the throughput of the UE. The PDSCHs may partially or fully overlap in frequency (overlapping reference elements (REs)) and/or in time (e.g., two PDSCHs received at the same time).

Also, because 5G NR spectrum is difficult to obtain and expensive, operators have utilized dynamic spectrum sharing (DSS) so that 5G NR and Long Term Evolution (LTE) transmissions can coexist in the same spectrum. However, to minimize or eliminate interference between communications of the two networks, one method the 5G NR network may use is rate matching its signals around the LTE signals.

SUMMARY

Some exemplary embodiments are related to a computer readable storage medium comprising a set of instructions that when executed by a processor cause the processor to perform operations. The operations include grouping capabilities of handling two overlapping physical downlink shared channel (PDSCH) transmissions into a plurality of groups, determining a UE capability of handling two overlapping PDSCH transmissions based on the plurality of groups and transmitting the UE capability to a next generation nodeB (gNB) of a 5G new radio (NR) wireless network.

Other exemplary embodiments are related to a computer readable storage medium comprising a set of instructions that when executed by a processor cause the processor to perform operations. The operations include determining if a demodulation reference signal (DMRS) of a physical downlink shared channel (PDSCH) transmission collides with a cell-specific reference signal (CRS) of a long term evolution (LTE) transmission and determining if the CRS originated from a same multi-transmission/reception point (TRP) as the DMRS.

Still other exemplary embodiments are related to a user equipment having a transceiver and a processor. The transceiver configured to connect to a first next generation (gNB) and a second gNB in a single-Downlink Control Information (DCI), multi-transmission/reception point (TRP) configuration. The processor is configured to group capabilities of handling two overlapping physical downlink shared channel (PDSCH) transmissions into a plurality of groups, and determine a UE capability of handling two overlapping PDSCH transmissions based on the plurality of groups. The transceiver is further configured to transmit the UE capability to one of the first gNB or second gNB.

DETAILED DESCRIPTION

Figure 1:
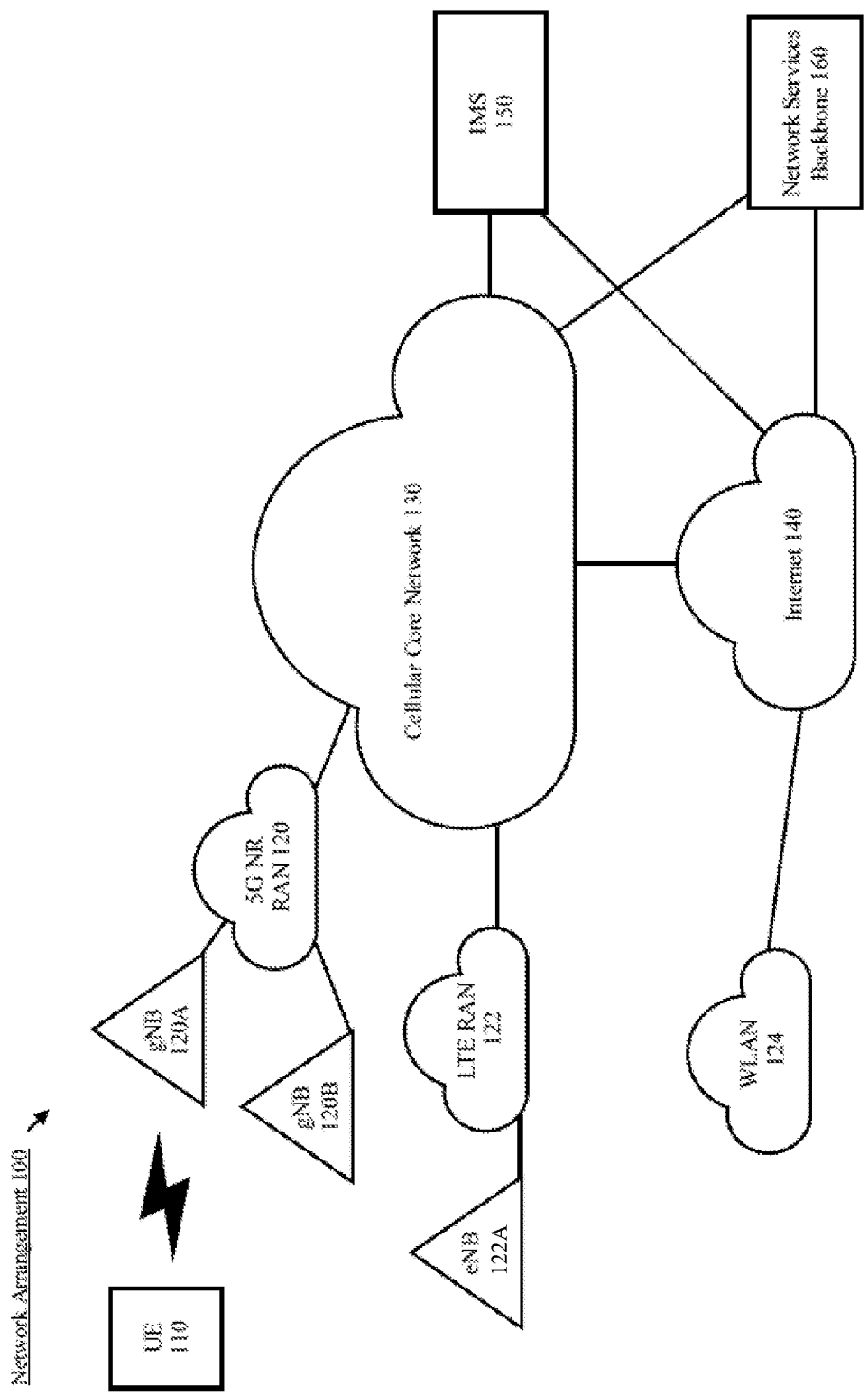
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to reporting user equipment (UE) physical downlink shared channel (PDSCH) overlapping capability with a gNB of a 5G new radio (NR) network. The exemplary embodiments further relate to default beam selection by a UE in self-scheduled and cross-carrier scheduled PDSCH reception. The exemplary embodiments further relate to determining a shift of a demodulation reference signal (DMRS) in a dynamic spectrum sharing (DSS) environment. The exemplary embodiments advantageously improve throughput and reception by the UE.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes 5G NR radio access technology (RAT). However, reference to a 5G NR network is merely provided for illustrative purposes. The exemplary embodiments may be utilized with any network that implements multiple transmission and reception points. Therefore, the 5G NR network as described herein may represent any network that includes the functionalities associated with multi-TRP.

Release 16 of 5G NR supports multi-downlink control information (DCI), multi-transmission reception point (TRP) communications. As such, a UE can receive two physical downlink shared channel (PDSCH) transmissions from two TRPs. Release 16 also supports fully overlapping, partially overlapping, and non-overlapping PDSCHs in the time domain and/or the frequency domain. However, an issue that arises with two PDSCHs overlapping in the frequency domain (overlapping resource elements (REs)) is interference. The network is unaware of the capability of the UE to handle such overlapping.

According to exemplary embodiments, the UE may group capabilities regarding overlapping PDSCHs into a plurality of groups and report the UE's capability based on the groups to the gNB. In this manner, the network is advantageously aware of the UE's capabilities when scheduling more than one PDSCH.

In multi-DCI, multi-TRP communications some issues that may arise when scheduling the PDSCH are (1) the transmission configuration indicator (TCI) field in the downlink control information (DCI) of the PDSCH is not configured; or (2) the UE does not have enough time to switch beams to receive the PDSCH scheduled by the gNB. In the case of cross-carrier PDSCH scheduling, it is undesirable to require the UE to buffer all component carriers (CCs) on a serving cell to determine which beam to use to receive the PDSCH.

According to exemplary embodiments, the UE determines a default beam to receive the PDSCH that overcomes these issues.

In a dynamic spectrum sharing (DSS) environment, both 5G NR signals and LTE signals are transmitted within the same spectrum. However, a possible issue that arises from this coexistence on the same spectrum is interference when the DMRS of a 5G NR transmission collides with a cell-specific reference signal (CRS) of an LTE transmission.

According to exemplary embodiments, the gNB shifts the DMRS in some scenarios when a collision with a CRS is expected.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A. The gNB 120A may be configured with the necessary hardware (e.g., antenna array), software and/or firmware to perform massive multiple in multiple out (MIMO) functionality. Massive MIMO may refer to a base station that is configured to generate a plurality of beams for a plurality of UEs. During operation, the UE 110 may be within range of a plurality of gNBs. Thus, either simultaneously or alternatively, the UE 110 may also connect to the 5G NR-RAN 120 via the gNB 120B. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection. The gNB may perform various operation related to determining a shift of a DMRS when a collision between a DMRS of the 5G NR RAN 120 collides with a CRS of the LTE RAN 122.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
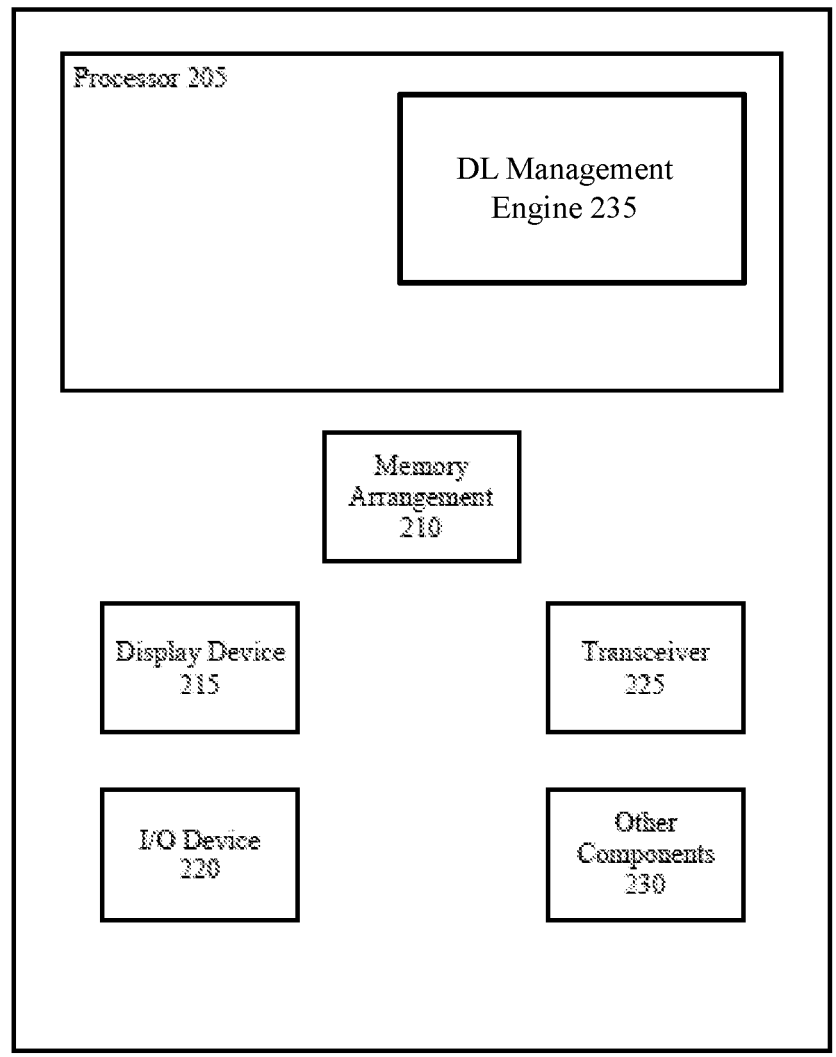
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc.

The processor 205 may be configured to execute a plurality of engines of the UE 110. For example, the engines may include a downlink (DL) management engine 235. The DL management engine 235 may perform various operations related to determining UE capability with regards to PDSCH overlapping and default beam selection.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
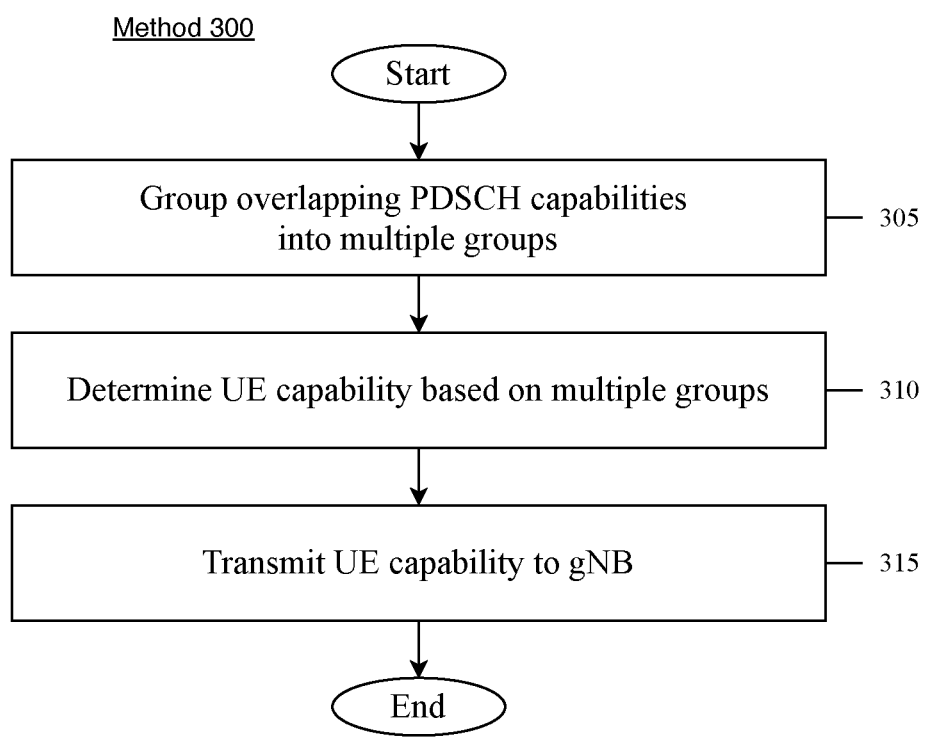
FIG. 3 shows a method of performing overlapping PDSCH capability signaling by a user equipment (UE) according to various exemplary embodiments.

FIG. 3 shows a method 300 of performing overlapping PDSCH capability signaling by a UE (e.g., UE 110) according to various exemplary embodiments. The method 300 assumes that the gNB 120A or 120B has two PDSCHs to transmit to the UE 110. At 305, the UE 110 groups the UE's capabilities for handling overlapping PDSCHs into multiple groups.

In some embodiments, the UE 110 may determine three (3) groups. In some embodiments, group 1 includes PDSCHs that do not overlap in the frequency domain, but are fully overlapping, partially overlapping, or not overlapping in the time domain. In this group, there is no interference of any REs between the two PDSCHs. However, the two PDSCHs can arrive in any temporal order. For example, the two PDSCHs can arrive at the same time or can overlap in time.

In some embodiments, group 2 includes PDSCHs that fully overlap. Group 2 can be classified in two ways: (1) both PDSCHs have the same number of resource blocks (RBs) and every resource elements (REs) of a first PDSCH overlaps with the REs of a second PDSCH; or (2) the first PDSCH includes the same amount of or more RBs than the second PDSCH and some of the REs of the first PDSCH overlap with all of the REs of the second PDSCH. That is, the second PDSCH REs can be considered a subset of the first PDSCH REs. Although fully overlapping PDSCHs cause interference, this interference is constant because it is across all REs.

In some embodiments, group 3 includes PDSCHs that partially overlap. Group 3 can be classified in two ways: (1) for at least one PDSCH (the first OR second PDSCH), at least one RE does not overlap with an RE of the other PDSCH; or (2) for each PDSCH (the first AND second PDSCH), at least one RE does not overlap with an RE of the other PDSCH. In group 3, demodulation of the PDSCHs will result in no interference on some REs but some interference on other REs. The UE 110 may use two receivers to handle the two PDSCHs (1 for each PDSCH).

The above grouping is merely an example of how the UE 110 may group the UE's overlapping PDSCH capabilities. In some embodiments, the UE 110 may group its capabilities in any alternative manner. For example, in some embodiments, group 1 may include PDSCHs that do not overlap in frequency nor in time. In other words, each PDSCH is received at a different time than the other PDSCH and none of the REs of either PDSCH overlap with the REs of the other PDSCH. In some embodiments, group 2 may include PDSCHs that (1) fully overlap in the frequency domain; or (2) do not overlap in the frequency domain, but partially or fully overlap in the time domain.

At 310, the UE 110 determines its capability of handling overlapping PDSCHs based on the groups the UE 110 determined at 305. In some embodiments, the UE 110 may support only Group 1. In some embodiments, the UE 110 may support all three groups. The UE 110 may support all or a subset of the capability groups. At 315, the UE 110 transmits the capabilities to the gNB 120A or 120B. In some embodiments, the network may require that the UE mandatorily support a minimum functionality. For example, the network may require the UE 110 to support the functions of Group 1 and optionally support the functions of Groups 2 and 3.

Figure 4:
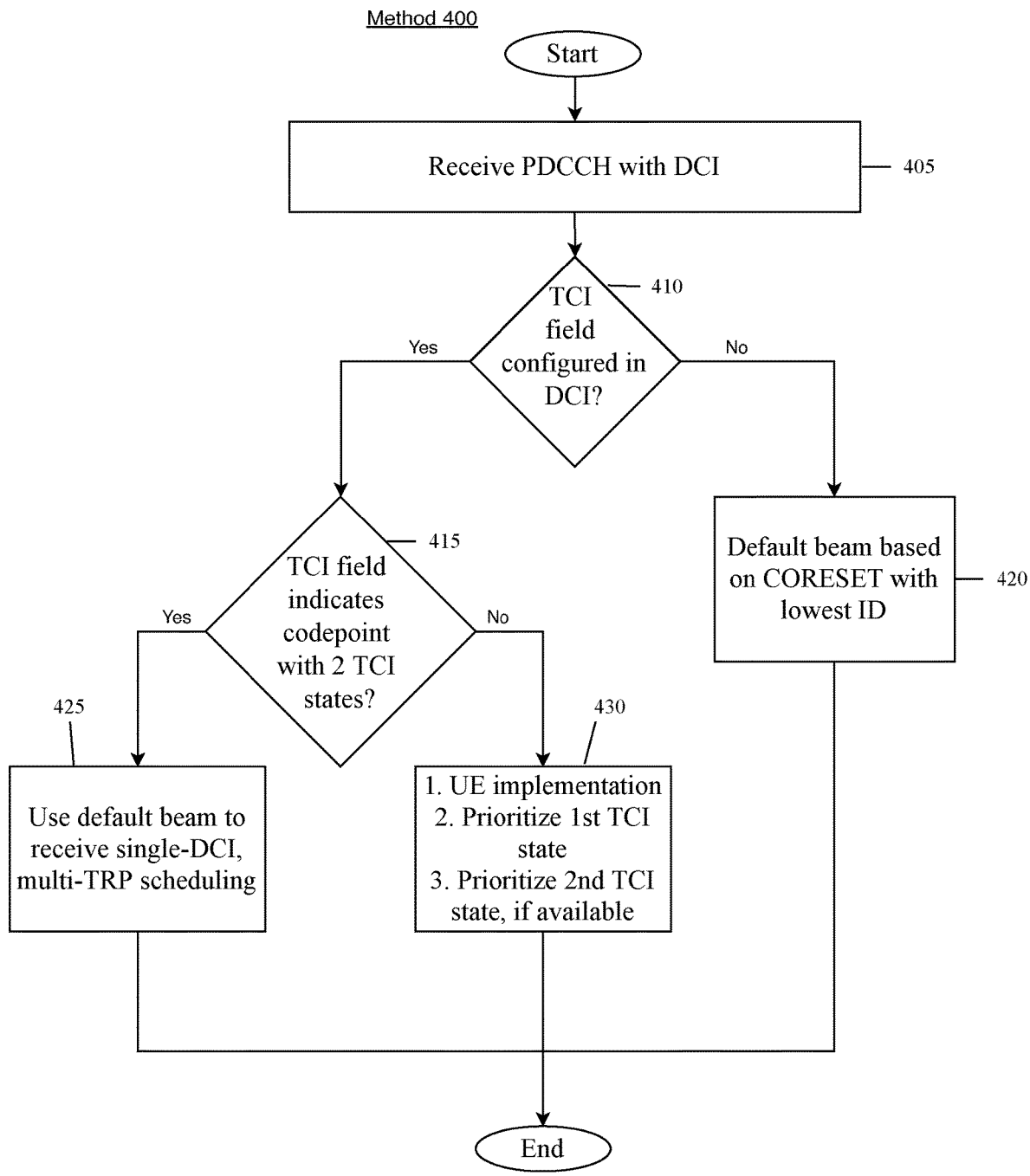
FIG. 4 shows a method of selecting a TCI state(s) for beam selection according to various exemplary embodiments.

FIG. 4 shows a method 400 of selecting a TCI state(s) for beam selection according to various exemplary embodiments. At 405, the UE 110 receives a PDCCH transmission including DCI information. At 410, the UE 110 determines whether the TCI field in is configured in the DCI. If the DCI field is not configured (e.g., by the gNB 120a or 120b), at 420, the UE 110 uses the CORESET associated with a monitored search space with the lowest controlResourceSetId in the latest slot in which one or more CORESETs within the active bandwidth part (BWP) of the serving cell are monitored. That is, the UE 110 selects the CORESET with the lowest ID in the slot in which the UE last monitored the PDCCH in the latest control monitoring duration. The UE 110 bases the default beam on the beam used for that particular CORESET for the PDSCH decoding.

If, at 410, the UE 110 determines that the DCI field is configured, the UE determines, at 415, whether the configured TCI field indicates a codepoint with two (2) TCI states. If the TCI field indicates a codepoint with two TCI states, the UE 110 uses, at 425, the default beam to receive the single-DCI, multi-TRP scheduling. That is, when the UE 110 decodes the TCI field containing 2 states, the UE understands that two default beams are used to buffer the PDSCH. After the UE 110 decodes the DCI, the UE understands that two PDSCHs are to be decoded. So, the UE 110 uses the default beam that contains two TCI states to decode the single DCI, multi-TRP scheduling.

If, at 415, the UE 110 determines that the TCI field indicates one (1) TCI state, the UE may handle this scenario in multiple manners at 430. In this scenario, the UE 110 decodes the TCI field including one TCI state and realizes that only one PDSCH is to be decoded. Although the UE 110 has two sets of buffers, each having a different beam, it is unnecessary to buffer the single PDSCH using two different beams. In some embodiments, the UE 110 is allowed to autonomously/independently decide how to decode the single PDSCH (UE implementation). In some embodiments, the UE may use one of the sets of buffers to decode the PDSCH. In some embodiments, the UE 110 may use both sets of buffers to decode the PDSCH to improve performance. In some embodiments, a rule may exist for such a scenario. For example, the rule may instruct the UE 110 to prioritize the first TCI state and base the default beam on this TCI state. The rule may instruct the UE 110 to prioritize the second TCI state, if it exists, and base the default beam on this TCI state. However, if the second TCI state is absent from the TCI codepoint, then the UE 110 may then default to the first TCI state.

Figure 5:
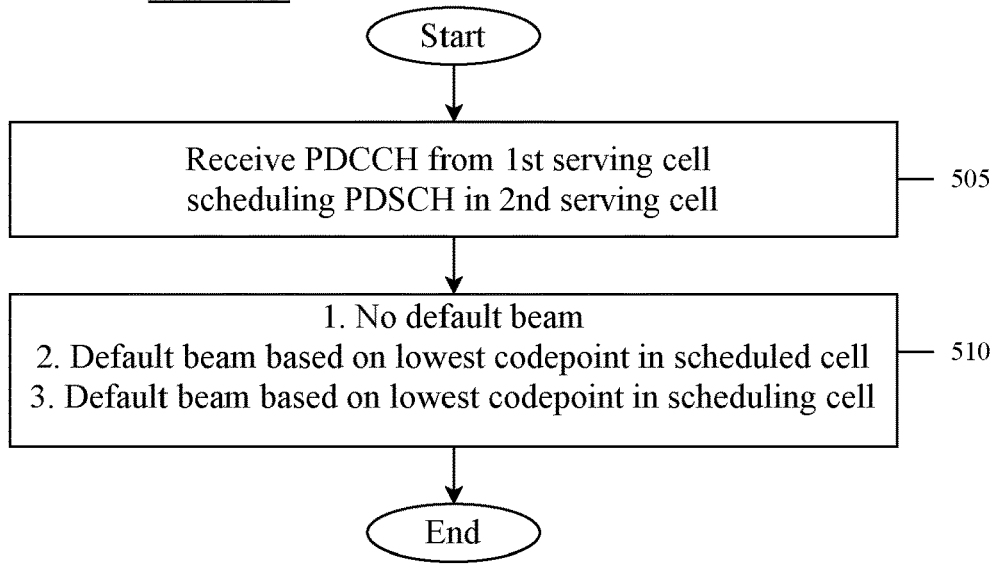
FIGS. 5 shows a method of determining a default beam in cross-carrier PDSCH scheduling according to various exemplary embodiments.

FIG. 5 shows a method 500 of determining a default beam in cross-carrier PDSCH scheduling according to various exemplary embodiments. In cross-carrier PDSCH scheduling, the PDCCH is received on a first CC/serving cell but the reception of the PDSCH scheduled by the CSI-RS is on a second CC/serving cell. At 505, the UE 110 receives the PDCCH from a first serving cell (e.g., gNB 120*a*) that schedules reception of the PDSCH in a second serving cell (e.g., gNB 120*b*).

At 510, the UE determines the default beam to use for reception of the PDSCH. In some embodiments, no default beam is selected. In such an embodiment, there a time offset between the DCI and PDSCH so that before PDSCH arrives, the UE 110 has enough time to decode the DCI. If the gNB does not explicitly identify which beam should be used to receive the PDSCH, the UE may buffer the PDSCH to determine which beam to receive the PDSCH on. As such, the UE needs enough time to switch beams.

In some embodiments, the UE 110 may base the default beam on the lowest codepoint from the plurality of TCI codepoints having two different TCI states in the scheduled cell (the cell in which the UE decodes the PDSCH). In some embodiments, the UE 110 may base the default beam on the lowest codepoint from the plurality of TCI codepoints having two different TCI states in the scheduling cell (the cell in which the UE decodes the DCI).

Figure 6:
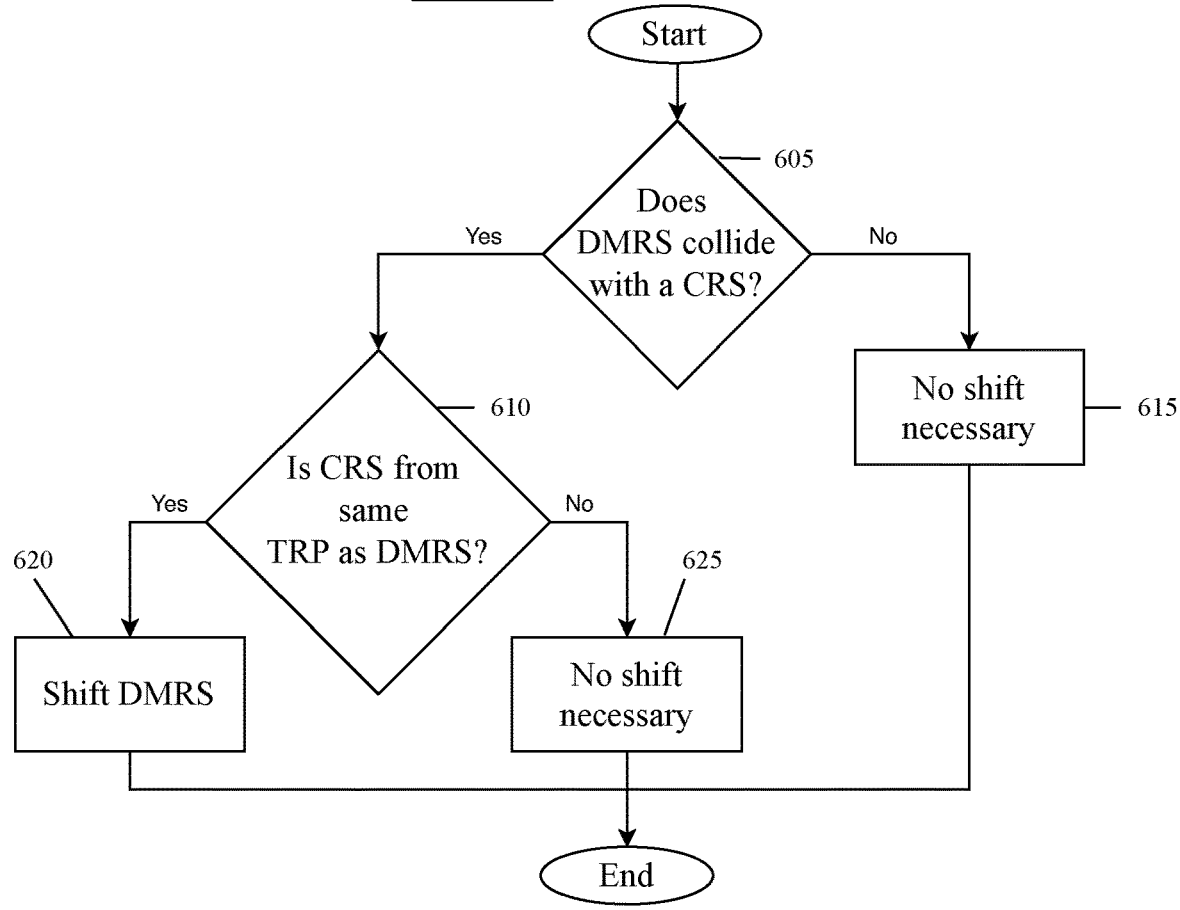
FIG. 6 a method of determining a shift of a demodulated reference signal (DMRS) in a dynamic spectrum sharing (DSS) environment according to various exemplary embodiments.

FIG. 6 a method 600 of determining a shift of a demodulated reference signal (DMRS) in a dynamic spectrum sharing (DSS) environment according to various exemplary embodiments. It is assumed that the network (e.g., LTE RAN 122) can configure six (6) CRS patterns in each CC (three CRSs for each of the two TRPs). Although the CRS signal occupies symbols 0, 4, 7, and 11, the method 600 focuses on the collision between the DMRS and the CRS at symbol 11.

At 605, the gNB 120*a* or 120*b* determines whether the DMRS of a PDSCH collides with a CRS of an LTE signal. If no collision is detected, the gNB 120*a*/120*b* determines, at 615, that no shift of the DMRS is necessary.

If, however, the gNB determines that a collision is detected at 605, the gNB then determines, at 610, if the CRS with which the DMRS collides is from the same TRP as the DMRS. If the CRS originates from a different TRP than the DMRS, the gNB determines, at 625, that no shifting of the DMRS is necessary. If, however, the gNB determines that the CRS and the DMRS are from the same TRP, the gNB shifts, at 620, the DMRS to the next symbol (e.g., symbol 12).

In some embodiments, the gNB 120*a*/120*b* determines from which TRP the CRS originated based on a CORESETPoolIndex value in a multi-DCI, multi-TRP system or a TCI state in a TCI codepoint in a single-DCI, multi-TRP system. For example, in the multi-DCI, multi-TRP system, a CORESETPoolIndex value of 0 may refer to the first TRP and a CORESETPoolIndex value of 1 may refer to the second TRP. In the single-DCI, multi-TRP system, the first TCI state in the TCI codepoint may be mapped to the first TRP and the second TCI state in the TCI codepoint may be mapped to the second TRP.

In some embodiments, if, at 605, the gNB 120A/120B determines that the DMRS collides with the CRS, the gNB may skip to 620 and shift the DMRS to the next symbol (e.g., symbol 12) regardless of which TRP the CRS originated from.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A computer readable storage medium comprising a set of instructions, wherein the set of instructions when executed by a processor cause the processor of a user equipment (UE) to perform operations, comprising: grouping capabilities of handling two overlapping physical downlink shared channel (PDSCH) transmissions into a plurality of groups; determining a UE capability of handling two overlapping PDSCH transmissions based on the plurality of groups; and transmitting the UE capability to a next generation nodeB (gNB) of a 5G new radio (NR) wireless network.

2. The computer readable storage medium of claim 1, wherein the groups comprise: a first group including two PDSCHs that do not overlap in a frequency domain, wherein the two PDSCHs of the first group one of (a) fully overlap, (b) partially overlap, or (c) do not overlap in a time domain; a second group including two PDSCHs that fully overlap in the frequency domain; and a third group including two PDSCHs that partially overlap in the frequency domain.

3. The computer readable storage medium of claim 2, wherein the two PDSCHs of the second group have an equal number of resource blocks (RBs) and every resource element (RE) of a first PDSCH overlaps with every RE of a second PDSCH.

4. The computer readable storage medium of claim 2, wherein a first PDSCH of the two PDSCHs of the second group includes a same amount of or more RBs than a second PDSCH of the two PDSCHs of the second group, and wherein a subset of REs of the first PDSCH overlap with all REs of the second PDSCH.

5. The computer readable storage medium of claim 2, wherein at least one RE of one of the two PDSCHs of the third group does not overlap with an RE of the other of the two PDSCHs of the third group.

6. The computer readable storage medium of claim 2, at least one RE in each of the two PDSCHs of the third group does not overlap with an RE of the other of the two PDSCHs of the third group.

7. The computer readable storage medium of claim 1, wherein the groups comprise: a first group including two PDSCHs that do not overlap in a frequency domain or in a time domain; a second group including (a) two PDSCHs that fully overlap in the frequency domain but do not overlap in the time domain, or (b) do not overlap in the frequency domain but partially or fully overlap in the time domain; and a third group including two PDSCHs that partially overlap in the frequency domain.

8. A user equipment (UE), comprising: a transceiver configured to connect to a first next generation (gNB) and a second gNB in a single-Downlink Control Information (DCI), multi-transmission/reception point (TRP) configuration; and a processor configured to: group capabilities of handling two overlapping physical downlink shared channel (PDSCH) transmissions into a plurality of groups, and determine a UE capability of handling two overlapping PDSCH transmissions based on the plurality of groups, wherein the transceiver is further configured to transmit the UE capability to one of the first gNB or second gNB.

9. The UE of claim 8, wherein the groups comprise: a first group including two PDSCHs that do not overlap in a frequency domain, wherein the two PDSCHs of the first group one of (a) fully overlap, (b) partially overlap, or (c) do not overlap in a time domain; a second group including two PDSCHs that fully overlap in the frequency domain; and a third group including two PDSCHs that partially overlap in the frequency domain.

10. The UE of claim 9, wherein the two PDSCHs of the second group have an equal number of resource blocks (RBs) and every resource element (RE) of a first PDSCH overlaps with every RE of a second PDSCH.

11. The UE of claim 9, wherein a first PDSCH of the two PDSCHs of the second group includes a same amount of or more RBs than a second PDSCH of the two PDSCHs of the second group, and wherein a subset of REs of the first PDSCH overlap with all REs of the second PDSCH.

12. The UE of claim 9, wherein at least one RE of one of the two PDSCHs of the third group does not overlap with an RE of the other of the two PDSCHs of the third group.

13. The UE of claim 9, at least one RE in each of the two PDSCHs of the third group does not overlap with an RE of the other of the two PDSCHs of the third group.

14. A processor configured to:
group capabilities of handling two overlapping physical downlink shared channel (PDSCH) transmissions into a plurality of groups;
determine a user equipment (UE) capability of handling two overlapping PDSCH transmissions based on the plurality of groups; and
transmit the UE capability to a next generation nodeB (gNB) of a 5G new radio (NR) wireless network.

15. The processor of claim 14, wherein the groups comprise:
a first group including two PDSCHs that do not overlap in a frequency domain, wherein the two PDSCHs of the first group one of (a) fully overlap, (b) partially overlap, or (c) do not overlap in a time domain;
a second group including two PDSCHs that fully overlap in the frequency domain; and
a third group including two PDSCHs that partially overlap in the frequency domain.

16. The processor of claim 15, wherein the two PDSCHs of the second group have an equal number of resource blocks (RBs) and every resource element (RE) of a first PDSCH overlaps with every RE of a second PDSCH.

17. The processor of claim 15, wherein a first PDSCH of the two PDSCHs of the second group includes a same amount of or more RBs than a second PDSCH of the two PDSCHs of the second group, and wherein a subset of REs of the first PDSCH overlap with all REs of the second PDSCH.

18. The processor of claim 15, wherein at least one RE of one of the two PDSCHs of the third group does not overlap with an RE of the other of the two PDSCHs of the third group.

19. The processor of claim 15, at least one RE in each of the two PDSCHs of the third group does not overlap with an RE of the other of the two PDSCHs of the third group.

20. The processor of claim 14, wherein the groups comprise:
a first group including two PDSCHs that do not overlap in a frequency domain or in a time domain;
a second group including (a) two PDSCHs that fully overlap in the frequency domain but do not overlap in the time domain, or (b) do not overlap in the frequency domain but partially or fully overlap in the time domain; and
a third group including two PDSCHs that partially overlap in the frequency domain.

* * * * *